United States Patent [19]

Inada et al.

[11] 3,999,809

[45] Dec. 28, 1976

[54] VEHICLE BRAKE SYSTEM WITH ANTI-SKID CONTROL APPARATUS

[75] Inventors: Masami Inada, Toyoake; Toshiyuki Kondo, Toyota; Masamoto Ando, Toyohashi, all of Japan

[73] Assignee: Aisin Seiki Kabushiki Kaisha, Kariya, Japan

[22] Filed: Jan. 20, 1976

[21] Appl. No.: 650,736

Related U.S. Application Data

[63] Continuation of Ser. No. 499,998, Aug. 23, 1974, abandoned.

[30] Foreign Application Priority Data

Sept. 18, 1973  Japan .................... 48-105667

[52] U.S. Cl. .................... 303/100; 303/115; 303/119
[51] Int. Cl.² .................... B60T 8/02
[58] Field of Search .................... 303/21, 61–63, 303/68–69, 91, 100, 113, 114, 115, 116, 117, 118, 119, 20; 188/181

[56] References Cited

UNITED STATES PATENTS

| | | | |
|---|---|---|---|
| 3,677,608 | 7/1972 | Lewis | 303/21 F |
| 3,809,437 | 5/1974 | Inada et al. | 188/181 A |
| 3,813,130 | 5/1974 | Inada | 303/21 F |
| 3,827,763 | 8/1974 | Kobashi et al. | 303/21 F |
| 3,830,550 | 8/1974 | Kondo | 303/21 F |

*Primary Examiner*—George E. A. Halvosa
*Assistant Examiner*—Douglas C. Butler
*Attorney, Agent, or Firm*—Pierce, Scheffler & Parker

[57] ABSTRACT

A vehicle brake system with anti-skid control apparatus including a master cylinder, a brake pedal operatively connected with the master cylinder and a wheel brake actuated by the fluid pressure from the master cylinder which includes a cut-off valve disposed between the master cylinder and the wheel brake for controlling communication between the master cylinder and the wheel brake, the fluid capacity of the fluid pressure circuit between the wheel brake and the cut-off valve capable of being increased or decreased, a valve for controlling the cut-off valve and for increasing or decreasing the capacity of the fluid pressure circuit according to the skid condition of the wheel and for selectively changing the speed of changing the capacity of the fluid pressure circuit at two steps in the capacity-decreasing direction, the system being characterized by a signal for controlling the increase or decrease of the fluid pressure circuit at high speed in the capacity-decreasing direction by the cut-off valve for a certain time after the brake pedal is released.

4 Claims, 4 Drawing Figures

VEHICLE BRAKE SYSTEM WITH ANTI-SKID CONTROL APPARATUS

This is a continuation of application Ser. No. 499,998 filed Aug. 23, 1974 and now abandoned.

BACKGROUND OF THE INVENTION

1. Field of the Invention

The present invention relates generally to vehicle brake system and more particularly to vehicle brake system having an anti-skid control apparatus therein.

2. Description of the Prior Art

Recently, an anti-skid control apparatus which can be varied at least into two steps, namely, the low and high speeds of increasing pressure, in order to improve its performance, is being developed. However, it takes generally more time for controlling the anti-skid control apparatus at the low speed of increasing pressure than at the high speed of increasing pressure in this anti-skid control apparatus, so that it is general that the state of low speed of increasing pressure is maintained normally in the non-actuating state of an orifice valve in order to improve the durability of a solenoid and to simplify the structure of the orifice valve. When the braking force is not required and a brake pedal is released by a vehicle driver, for example, during anti-skid actuation, i.e., during interrupting state of communication between a master cylinder and a wheel cylinder, the anti-skid actuation is going to return to its non-actuating state. However, in this state the low speed of increasing pressure is maintained as above-mentioned, therefore, a few seconds are necessary to return to the non-actuating state of the anti-skid control apparatus. Accordingly, the remaining pressure according to the spring force of a cut off valve of an actuator is generated at the side of the wheel cylinder during this returning state of the anti-skid control apparatus and the braking force is not able to release. The cut off valve of the actuator is cut off and the fluid pressure is not rapidly supplied from the master cylinder to the wheel cylinder, even when the braking force is again required during the returning state, namely, during the non-actuating state of the anti-skid control apparatus.

SUMMARY OF THE INVENTION

It is therefore an object of the present invention to provide an improved anti-skid control apparatus for obviating the above conventional drawback.

Another object of the present invention is to provide an improved and highly safe anti-skid control apparatus which may quickly perform next braking actuation by fluidically communicating the master cylinder and the wheel cylinder according to suddenly increase the fluid pressure for a certain time after brake releasing operation.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
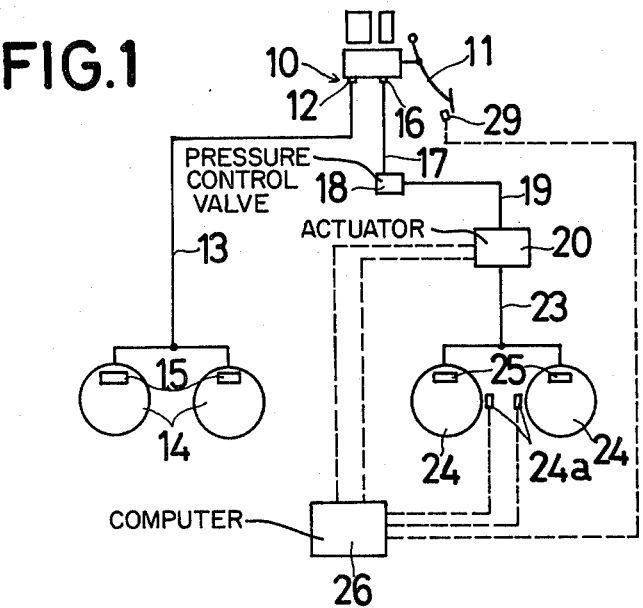
FIG. 1 is a schematic view of a vehicle brake system with an anti-skid control apparatus constructed according to the invention.

Referring now to FIG. 1, the reference numeral 10 is a tandem master cylinder and a brake pedal 11 is operatively connected therewith. A port 12 of the tandem master cylinder 10 is fluidically connected with wheel cylinders 15, 15 of front wheels 14, 14 through a conduit 13, and a port 16 of the tandem master cylinder 10 is fluidically connected with a well-known fluid pressure control valve 18 through a conduit 17. The valve 18 is further fluidically connected with an annular chamber 21 (FIG. 2) of the actuator 20 through a conduit 19, and is further fluidically connected with wheel cylinders 25, 25 of rear wheels 24, 24 through the annular chamber 21, an annular chamber 22 and a conduit 23. The reference numeral 26 is a conventional computer means electrically connected with solenoids 27, 28 (FIG. 3) of the actuator 20. A switch 29 for detecting the actuation of the brake pedal 11 is closed when the brake pedal 11 is released and is open when the brake pedal 11 is depressed. The reference numerals 24a, 24a are conventional sensors for detecting the rotational movement of the rear wheels 24,24 and is electrically connected with the computer means 26.

Figure 2:
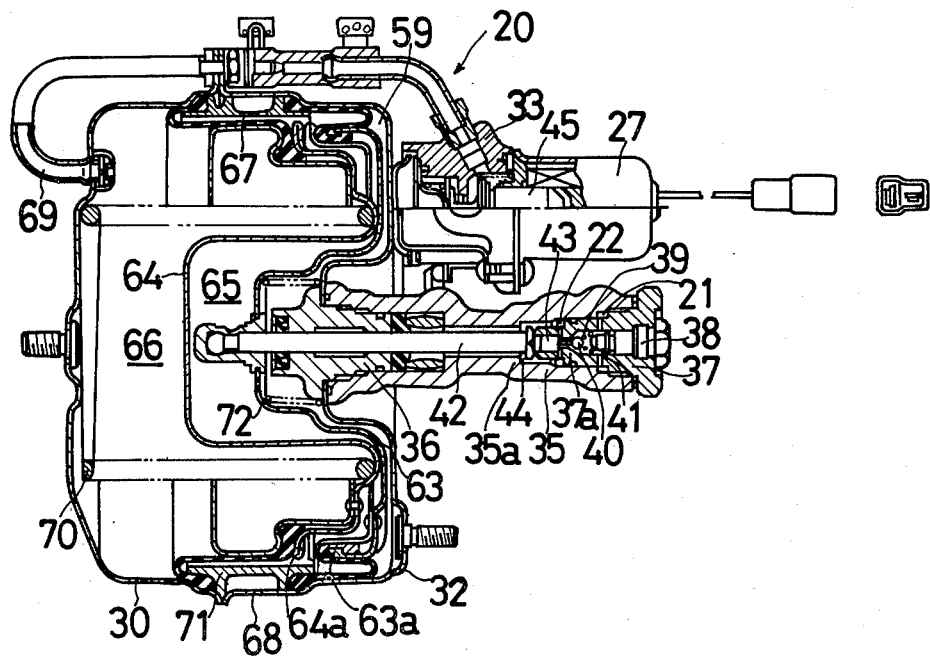
FIG. 2 is a partial sectional view of an actuator used in FIG. 1.
Figure 3:
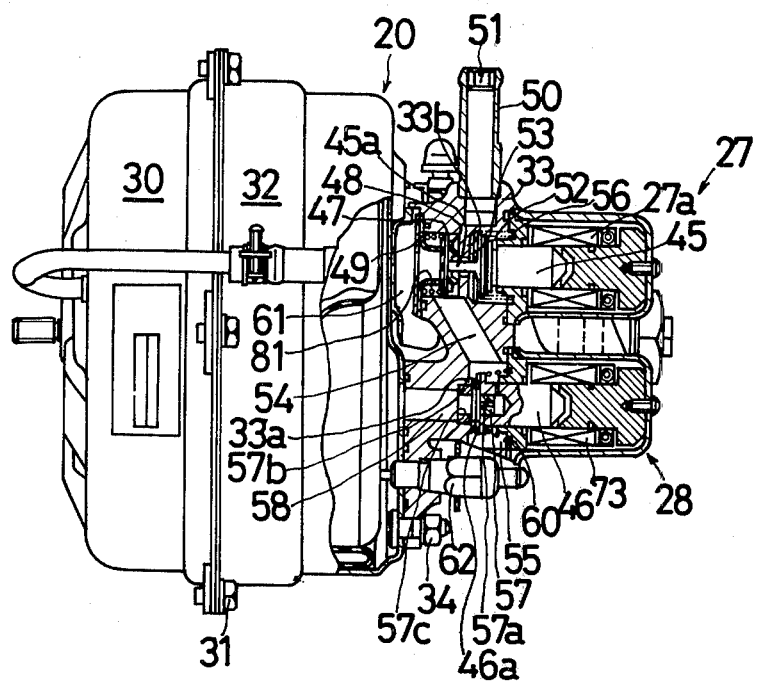
FIG. 3 is a view similar to FIG. 2, however, showing a valve part of the actuator.

Referring now to FIGS. 2 and 3, the reference numeral 30 is a cover which is fixed to a cover 32 by means of a plurality of bolts and nuts means 31 and the cover 32 is fixed to a valve body 33 by a plurality of bolts and nuts means 34, respectively. A guide member 36 is screwed into the left end portion of a cylinder body 35 through the cover 32. A seat member 37 is screwed into the right end portion of the cylinder body 35 and further a plug 38 is screwed into the seat member 37. A spring 41 is disposed within a chamber 39 formed by the seat member 37 and the plug 38 and the one end of the spring 41 contacts the plug 38 and the other end of the spring 41 contacts a cut off valve 40 in order to seat on a seat portion 37a of the seat member 37. A piston 42 is slidably disposed within the guide member 36. A small piston 43 is slidably disposed within the seat member 37 and one end of the small piston 43 contacts the cut off valve 40 and the other end of the small piston 43 contacts the piston 42. A reference numeral 44 is a hydraulic chamber formed by an inner wall 35a of the cylinder body 35 and the seat member 37. A plunger 45 is slidably disposed within the solenoid 27 and a plunger 46 is slidably disposed within the solenoid 28, respectively. A left-end projecting portion 45a formed on the plunger 45 contacts a plate 47 and each side of a valve member 48 is fixedly mounted on the both sides of the plate 47. A seat member 49 is fixedly provided on the valve body 33 and the valve member 48 is normally seated on the seat member 49. A connector 50 is screwed into the valve body 33 and forms a port 51 for directing the vacuum. The vacuum transmitted into the port 51 is normally communicated with a chamber 55 of the solenoid 28 via a chamber 52, a hole 53 provided in the valve body 33 and a hole 54. The reference numeral 56 is a spring disposed within the chamber 52 and urges the plunger 45 into the leftward direction in FIG. 3. A small orifice member 57 formed with a passage 57a therein is screwed in the plunger 46. The chamber 55 is communicated with a chamber 59 (FIG. 2) through a hole 46a formed on the outer periphery of the plunger 46, the passage 57a of the small orifice 57 and a passage 58 provided in the valve body 33 in the nomal state. A spring 60 disposed within the chamber 55 urges the plunger 46 in the leftward direction in FIG. 3. The reference numeral 61 is a chamber communicating with the atmospheric air and the valve member 48 is normally seated on the seat member 49, so that the atmospheric air is not transmitted into the hole 54 of the valve body 33. A seat member 33a on which the valve member 46a integrally actuated with the plunger 46 is seated is formed in the valve body 33, and when the plunger 46 is rightwardly moved in FIG. 3, the valve member 46a is released from the seat member 33a and then the passage 54 is communicated with a passage 58 via a passage 57c of a large orifice member 57b. A seat member 33b on which the valve member 48 integrally actuated with the plunger 45 is seated is formed in the valve body 33, and when the plunger 45 is rightwardly moved in FIG. 3, the valve member 48 is released from the seat member 33b and then the chamber 61 communicated with the atmospheric air is communicated with the hole 54 and the communication between the inlet port 51 of the connector 50 and the hole 54 is interrupted by the valve member 48.

Figure 4:
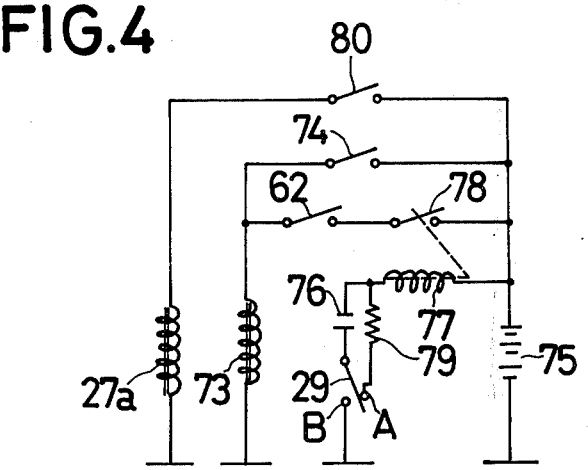
FIG. 4 is a schematic diagram of a circuit according to the invention.

A switch 62 in FIG. 4 is closed when the cut off valve 40 is seated on the seat portion 37a of the seat member 37 and is open when the cut off valve 40 is released from the seat portion 37a of the seat member 37 as shown in FIG. 2. A first diaphragm piston 63 and a second diaphragm piston 64 divide the covers 30 and 32 into the chamber 59, a chamber 65 and a chamber 66. The chamber 65 is always communicated with the atmospheric air through a hole 67 and a hole 68 and the chamber 66 is always communicated with the connector 50 to a source of vacuum, not shown, through a passage 69. The cut off valve 40 is seated on the seat portion 37a of the seat member 37 by the leftward movement of the piston 42 operatively connected with the diaphragm piston 63 and further the capacity of the fluid pressure circuit of the rear wheels 24,24 is increased, and thereby the fluid pressure to the wheel cylinders 25,25 of the rear wheels 24,24 is reduced. When there is no vacuum in the source of vacuum, not shown, namely, the atmospheric air occupies the chamber 66, the piston 42 is rightwardly moved by the atmospheric air within the chamber 66 via the diaphragm spring 70 and 72 in FIG. 2 and the cut off valve 40 is held open. The reference numeral 71 is a holding member for the pistons 64 and 63, and the outer periphery of the diaphragm pistons 64 and 63 is sealed by the holding member 71. The holding member 71 represents a smooth cylindrical form and projecting portions 64a and 63a of the diaphragm pistons 64 and 63 may be smoothly and slidably moved within the holding member 71. The reference numeral 72 is a spring disposed within the chamber 59. The reference numeral 81 is a spring for urging the valve member 48 in order to contact the projecting portion 45a of the plunger 45.

Next, referring to FIG. 4 showing partial details of the computer 26, the reference numeral 73 denotes a coil of the solenoid 28. When it is noticed by the computer 26 that the fluid pressure to the wheel cylinders 25,25 of the rear wheels 24,24 is suddenly increased or decreased by the signal from the sensors 24a,24a, the switch 74 is closed and the coil 73 is the solenoid 28 is energized so that the plunger 46 is rightwardly moved in FIG. 3. On the contrary, when it is noticed by the computer 26 that the fluid pressure to the wheel cylinders 25,25 of the rear wheels 24,24 is slowly increased or decreased by the signal from the sensors 24a,24a, the switch 74 is opened and the plunger 46 is held in the state shown in FIG. 3. The reference numeral 75 is an electric source and the reference numeral 76 is a condenser stored for a preset time and the reference numeral 77 is a coil for actuating a relay switch 78. When the switch 29 is closed, namely, the brake pedal 11 is initially depressed and thereafter the depressing force of the brake pedal 11 is released, the electric current flows to the coil 77 only for a certain time (determined by the capacity of the condenser 76 and the coil 77) and the relay switch 78 is closed. The reference numeral 79 is a resistance for discharge of the electric voltage stored in the condenser 76. A switch 80 is electrically connected with the coil 27a of the solenoid 27, and when it is noticed by the computer 26 that the fluid pressure to the wheel cylinders 25,25 of the rear wheels 24,24 is increased, the switch 80 is opened. On the contrary, when it is noticed by the computer 26 that the fluid pressure to the wheel cylinders 25,25 of the rear wheels 24,24 is decreased, the switch 80 is closed and the coil 27a of the solenoid 27 is energized and then the plunger 45 is rightwardly moved in FIG. 3.

The operation of the invention will now be described hereinbelow in detail.

When the brake pedal 11 is depressed for arresting the movement of the vehicle, the fluid pressure generated in the tandem master cylinder 10 is transmitted from the port 12 to the wheel cylinders 15,15 of the front wheels 14,14 via conduit 13 and is transmitted from the port 16 to the wheel cylinders 25,25 of the rear wheels 24,24 via the conduit 17, the fluid pressure control valve 18, the conduit 19, the annular chamber 21 of the actuator 20, the chamber 39, the annular chamber 22 and the conduit 23, whereby the vehicle is braked.

Next, when the brake pedal 11 is released, the switch 29 is contacted with the contacting point B and is closed and the voltage from the electric source 75 is stored in the condenser 76 for a preset time through the coil 77 and at the same time the relay switch 78 is closed for said preset time, however, the switch 62 is open so that the circuit including the relay switch 78 is not completed.

1. When the brake pedal 11 is depressed and it is noticed by the computer 26 according to the signal from the sensors 24a,24a that the rear wheels 24,24 are locked or likely to be locked, the switch 80 is closed by the signal from the computer 26 and then the coil 27a of the solenoid 27 of the actuator 20 is energized and the plunger 45 is rightwardly moved in FIG. 3. Accordingly, the valve member 48 is released from the seat member 49 and is seated on the seat member 33b and then the communication between the inlet port 51 of the connector 50 and the hole 54 is interrupted, and the chamber 61 communicated with the atmospheric air and the hole 54 are communicated with each other and the atmospheric air is transmitted into the chamber 55. The atmospheric air transmitted into the chamber 55 is transmitted into the chamber 59 through the passage 57a of the small orifice member 57, the passage 57c of the large orifice member 57b and the passage 58. The piston 42 is leftwardly moved by the atmospheric air transmitted into the chamber 59 through the diaphragm 63 of FIG. 2 and the cut off valve 40 is seated on the seat portion 37a of the seat member 37. Therefore, the communication between the annular chamber 21 connected with the tandem master cylinder 10 and the annular chamber 22 connected with the wheel cylinders 25,25 is interrupted and the fluid pressure from the tandem master cylinder 10 is not supplied to the wheel cylinders 25,25 of the rear wheels 24,24. At this time, the cut off valve 40 is seated on the seat portion 37a of the seat member 37 so that the switch 62 is closed and it is noticed by the vehicle driver that the rear wheels 24,24 are locked or likely to be locked.

When it is noticed by the computer 26 according to the signal from the sensors 24a,24a that the state of being locked or likely to be locked of the rear wheels 24,24 is cancelled, the switch 80 is opened and the solenoid 27 is deenergized. Therefore, the plunger 45 is turned back to the state of FIG. 3 and the valve member 48 is released from the seat member 33b and the valve member 48 is seated on the seat member 49, and then the communication between the chamber 61 and the hole 54 in interrupted and the inlet port 51 of the connector 50 is communicated with the hole 54. Accordingly, the vacuum from the inlet port 51 of the connector 50 is transmitted into the chamber 59 via the chamber 52, the passage 53, the hole 54, the chamber 55, the passage 57a of the small orifice member 57, the passage 57b of the large orifice member 57b and the passage 58. Therefore, the diaphragm piston 63 is rightwardly moved by the atmospheric air within the chamber 65 and the cut off valve 40 is released from the seat portion 37a of the seat member 37 by the piston 42 operatively connected with the diaphragm piston 63 as shown in FIG. 2, and then the annular chambers 21 and 22 are again communicated with each other and the fluid pressure from the tandem master cylinder 10 is supplied to the wheel cylinders 25,25 of the rear wheels 24,24 through the above-mentioned course.

2. When it is noticed by the computer 26 that the state of the road surface becomes suddenly bad (from high μ road surface to low μ road surface) so as to reduce the fluid pressure to the wheel cylinders 25,25 of the rear wheels 24,24 (at this time the switch 80 is closed) and the fluid pressure to the wheel cylinders 25,25 of the rear wheels 24,24 must be suddenly reduced, the swtich 74 is closed by the signal from the computer 26 and then the coil 73 of the solenoid 28 is energized, therefore, the plunger 46 is rightwardly moved in FIG. 3. Accordingly, the valve member 46a is released from the seat member 33a, and the atmospheric air transmitted from the hole 54 to the passage 57a of the small orifice member 57 via the chamber 55 is transmitted also from the passage 57c of the large orifice member 57b to the chamber 58 and then the fluid pressure to the wheel cylinders 25,25 of the rear wheels 24,24 is suddenly reduced.

3. When it is noticed by the computer 26 that the state of the road surface becomes suddenly better (from low μ road surface to high μ road surface) so as to increase the fluid pressure to the wheel cylinders 25,25 of the rear wheels 24,24 (at this time the switch 80 is open) and the fluid pressure to the wheel cylinders 25,25 of the rear wheels 24,24 must be suddenly increased, the switch 74 is closed by the signal from the computer 26 and then the coil 73 of the solenoid 28 is energized, therefore, the plunger 46 is rightwardly moved in FIG. 3. Accordingly, the valve member 46a is released from the seat member 33a, and the vacuum transmitted from the hole 54 to the passage 57a of the small orifice member 57 via the chamber 55 is transmitted also from the passage 57c of the large orifice member 57b to the chamber 58 and then the fluid pressure to the wheel cylinders 25,25 of the rear wheels 24,24 is suddenly increased.

4. When the brake pedal 11 is released in the state of (1), the fluid pressure of the tandem master cylinder 10 to the annular chamber 21 becomes almost zero so that a pressure difference between both sides of the cut-off valve 40 is generated and the cut-off valve 40 is released from the seat portion 37a of the seat member 37, and the switches 80 and 74 are opened. However, the switch 29 is contacted with the contacting point B and the electric current stored in the condenser 76 flows to the coil 77 for a pre-set time and the relay switch 78 is closed for same time. Since the cut-off valve 40 is seated on the seat portion 37a of the seat member 37, the switch 62 is closed and the coil 73 of the solenoid 28 is energized and the plunger 46 is rightwardly moved in FIG. 3. The valve member 46a is released from the seat portion 33a by the rightward movement of the plunger 46. Accordingly, the vacuum or the atmospheric air transmitted from the hole 54 to the passage 57a of the small orifice member 57 via the chamber 55 is transmitted into the chamber 58 also from the passage 57c of the large orifice member 57b and then the piston 42 is rapidly rightwardly moved in FIG. 2 and the cut valve 40 is opened as viewed from FIG. 2. Therefore, the communication between the tandem master cylinder 10 and the wheel cylinders 25,25 is secured and the next braking operation is safely and surely attained.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A vehicle brake system with an anti-skid control apparatus including a master cylinder, a brake pedal operatively connected with said master cylinder and a wheel brake means for attaining the braking operation by the fluid pressure from said master cylinder, comprising;

cut-off valve means disposed between said master cylinder and said wheel brake means for controlling communication between said master cylinder and said wheel brake means;

capacity-increasing or decreasing means disposed between said wheel brake means and said cut-off valve means for increasing or decreasing the hydraulic fluid supplied to said wheel brake means;

first valve means for selectively increasing or decreasing said capacity-increasing or decreasing means according to the anti-skid condition of said wheel brake means;

second valve means for slowly or quickly actuating said capacity-increasing or decreasing means in accordance with an anti-skid condition of said wheel brake means;

switch means actuatable for a preset time interval by release of said brake pedal; and computer means responsive to the number of rotations of the vehicle wheels and for generating signals according to the number of rotations thereof and for supplying said signals to said first and second valve means, said signals being supplied in response to the actuation of said switch means when said brake pedal is released;

whereby the capacity of said capacity-increasing or decreasing means is decreased by said first valve means and said capacity-increasing and decreasing means is quickly actuated by said second valve means in response to the signals supplied by said computer means when said switch means is actuated to quickly establish communication between said master cylinder and said wheel brake means for a preset time when said brake pedal is released.

2. A vehicle brake system with an anti-skid control apparatus as set forth in claim 1, wherein said first valve means includes a plate member and a valve member fixedly mounted on both sides of said plate member, and a seat member for seating said valve member.

3. A vehicle brake system with an anti-skid control apparatus as set forth in claim 1, wherein said second valve means includes a small orifice for slowly actuating said capacity-increasing or decreasing means in accordance with an anti-skid condition of said brake means and a large orifice for quick actuation thereof.

4. A vehicle brake system with an anti-skid control apparatus as set forth in claim 1, and further comprising means for opening said cut-off valve means for communicating said master cylinder with said wheel brake means for a preset time after said brake pedal is released.

* * * * *